US008750639B2

(12) United States Patent
Demandolx

(10) Patent No.: US 8,750,639 B2
(45) Date of Patent: Jun. 10, 2014

(54) AUTOMATIC SHARPENING OF IMAGES

(75) Inventor: Denis Demandolx, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 13/280,429

(22) Filed: Oct. 25, 2011

(65) Prior Publication Data

US 2013/0101212 A1    Apr. 25, 2013

(51) Int. Cl.
*G06K 9/40* (2006.01)
(52) U.S. Cl.
USPC ........................................................ 382/263
(58) Field of Classification Search
None
See application file for complete search history.

(56) References Cited

U.S. PATENT DOCUMENTS

| 6,011,875 | A | * | 1/2000 | Laben et al. | 382/276 |
|---|---|---|---|---|---|
| 6,097,847 | A | | 8/2000 | Inoue | |
| 7,268,916 | B2 | | 9/2007 | Kokemohr et al. | |
| 7,724,980 | B1 | | 5/2010 | Shenzhi | |
| 8,411,970 | B2 | * | 4/2013 | Thakkar | 382/228 |
| 2002/0171855 | A1 | | 11/2002 | Edge | |
| 2003/0228064 | A1 | * | 12/2003 | Gindele et al. | 382/260 |
| 2006/0110033 | A1 | * | 5/2006 | Toshihiro | 382/162 |
| 2006/0227382 | A1 | * | 10/2006 | Ng et al. | 358/3.26 |
| 2008/0144962 | A1 | * | 6/2008 | Jung et al. | 382/274 |
| 2010/0129003 | A1 | * | 5/2010 | Pace et al. | 382/266 |
| 2010/0238353 | A1 | * | 9/2010 | Lin | 348/607 |
| 2011/0007175 | A1 | | 1/2011 | Fujita et al. | |

FOREIGN PATENT DOCUMENTS

| CN | 102938140 | | 2/2013 |
|---|---|---|---|
| JP | 2004007202 | A | 1/2004 |
| JP | 2006024097 | A | 1/2006 |
| JP | 2009060385 | A | 3/2009 |

OTHER PUBLICATIONS

"International Search Report", Mail Date: Jan. 7, 2013, Application No. PCT/US2012/061746, Filed date: Oct. 24, 2012, pp. 9.
Zhu, et al., "Automatic Parameter Selection for Denoising Algorithms Using a No-Reference Measure of Image Content", in IEEE Transactions on Image Processing, vol. 19, Issue 12, Dec. 2010, pp. 3116-3132.
"Sharpen using Unsharp Mask", Retrieved on: Sep. 19, 2011, Available at: http://help.adobe.com/en_US/photoshopics/using/WSDFE786F0-6401-4dba-A009-5E15118B9A6Ca.html.
Kobayashi, et al., "Content-Adaptive Automatic Image Sharpening", In Proceedings of 20th International Conference on Pattern Recognition, Aug. 23-26, 2010, pp. 2214-2217.

* cited by examiner

*Primary Examiner* — Jingge Wu
(74) *Attorney, Agent, or Firm* — Steve Spellman; Jim Ross; Micky Minhas

(57) ABSTRACT

Various embodiments describe image sharpening techniques that automatically estimate a sharpening amount for an unsharp mask filter for image enhancement based upon a statistical correlation between detail coefficients at a first resolution and at a second resolution. In various embodiments, statistical deviation of absolute values of detail coefficients for both the image at full resolution and the image downsampled by a pre-determined factor, e.g. a factor of two (half resolution), are retrieved. In various embodiments, the statistical deviation is retrieved for a histogram of the image at the first resolution and a histogram of the image at the second resolution. The linear model between the statistical deviation of detail coefficients at the first resolution and the second resolution is used to calculate the sharpening amount and the unsharp mask filter is applied to the image to produce a sharpened image.

18 Claims, 6 Drawing Sheets

AUTOMATIC SHARPENING OF IMAGES

BACKGROUND

Digital images are frequently sharpened after they are taken in order to reduce or remove blurriness, enhance the focus of the image, or to simulate a better resolution. Sharpening can be performed by deconvolution methods or by utilizing an unsharp mask filter to increase the contrast of edges within an image. An unsharp mask filter identifies pixels that differ from surrounding pixels by a defined threshold and increases the contrast by a specified sharpening amount. The sharpening amount can be determined and set by users, making the sharpening amount dependent on the display conditions and the visual system of the user. In other words, the sharpening amount, though a main parameter in the unsharp mask filter, is usually set according to a subjective rather than an objective determination.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments describe image sharpening techniques that automatically estimate a sharpening amount for an unsharp mask filter for image enhancement based upon a statistical correlation between detail coefficients at a normal resolution and at a lower resolution. In various embodiments, statistical deviation of absolute values of detail coefficients for both the image at full resolution and the image downsampled by a pre-determined factor, e.g. a factor of two (half resolution), are retrieved. The linear model between the statistical deviation of detail coefficients at the first resolution and the second resolution is used to calculate the sharpening amount and the unsharp mask filter is applied to the image to produce a sharpened image.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments describe image sharpening techniques that automatically estimate a sharpening amount for an unsharp mask filter for image enhancement based upon a statistical correlation between detail coefficients at a first resolution and at a second resolution. In various embodiments, statistical deviation of absolute values of detail coefficients for both the image at full resolution and the image downsampled by a pre-determined factor, e.g. a factor of two (half resolution), are retrieved. The statistical deviation can be, for example, a standard deviation, an absolute deviation, a median absolute deviation, a third-quartile absolute deviation, a ninth-decile absolute deviation, or a ninety-ninth-centile absolute deviation, to name just a few. In various embodiments, the statistical deviation is retrieved for a histogram of the image at the first resolution and a histogram of the image at the second resolution. The linear model between the statistical deviation of detail coefficients at the first resolution and the second resolution is used to calculate the sharpening amount and the unsharp mask filter is applied to the image to produce a sharpened image.

In the discussion that follows, a section entitled "Example Operating Environment" describes an operating environment in accordance with one or more embodiments. Next, a section entitled "Image Sharpening" describes various embodiments of automatically estimating a sharpening amount value for an unsharp mask filter and applying the unsharp mask filter to an image to produce a sharpened image. A section entitled "Automatic Estimation of Sharpening Amount Value" describes various embodiments for automatically estimating a sharpening amount value utilizing histograms of the image at full resolution and downsampled by a predetermined factor. Finally, a section entitled "Example System" describes an example system that can be used to implement one or more embodiments.

Consider, now, an example operating environment in accordance with one or more embodiments.

Example Operating Environment

Figure 1:
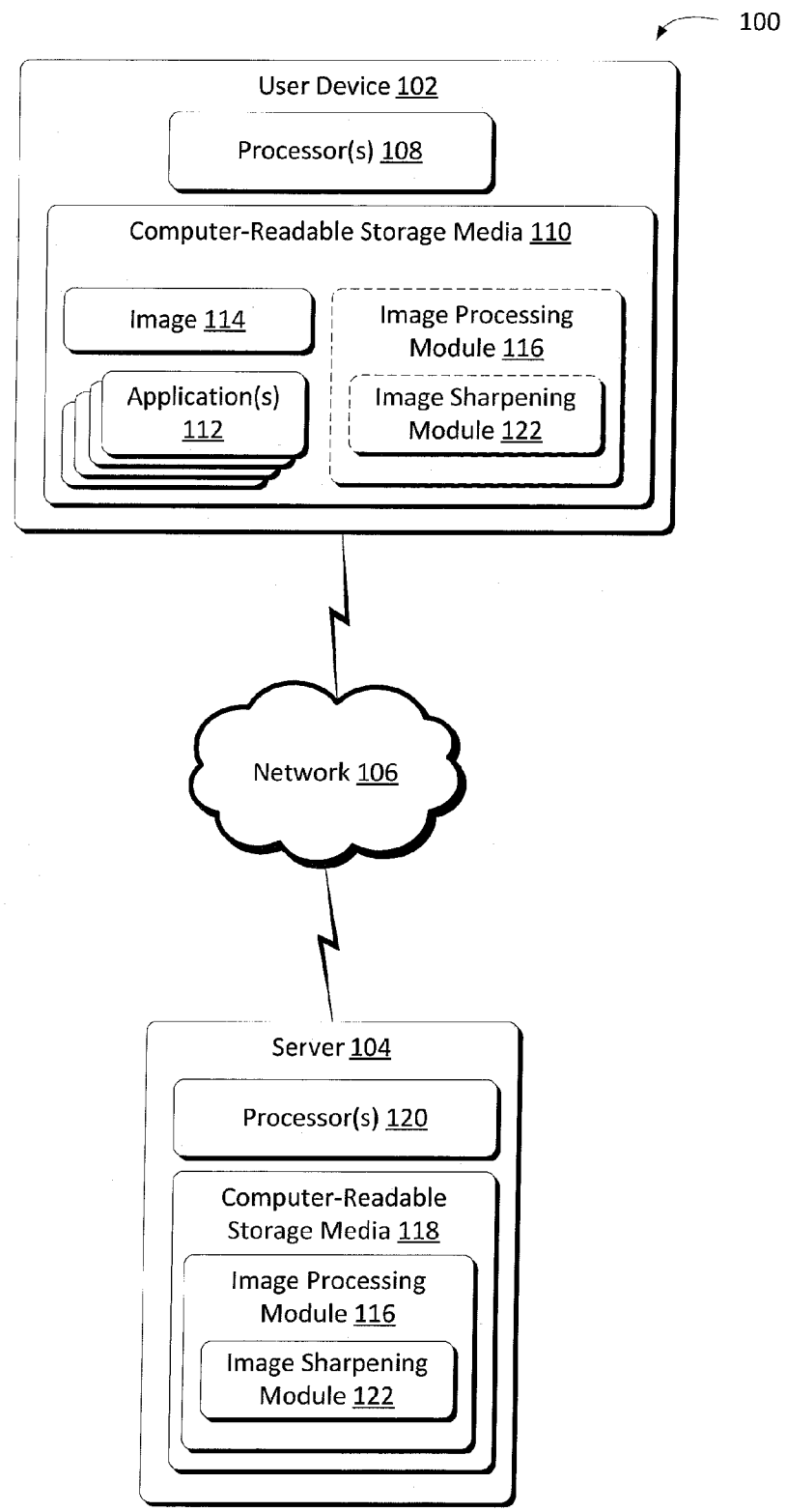
FIG. 1 illustrates an example environment in accordance with one or more embodiments.

FIG. 1 is an illustration of an example environment 100 in accordance with one or more embodiments. Environment 100 includes a user device 102 communicatively coupled to a server 104 through a network 106, such as the Internet. User device 102 can include one or more processors 108 and computer-readable storage media 110. User device 102 can be embodied as any suitable computing device such as, by way of example and not limitation, a desktop computer, a portable computer, a netbook, a handheld computer such as a personal digital assistant (PDA), a cell phone, and the like.

Computer-readable storage media 110 can include one or more applications 112, which can include software executables such as an operating system, web browser, or other applications. Computer-readable storage media 110 can also include one or more images, such as image 114. Image 114 can be an image that has been downloaded from another device, such as a camera, or from the Internet or some other network, or can be an image that was taken with user device 102. In various embodiments, a user can import image 114 into an executable for image processing, such as image processing module 116.

In the embodiment shown in FIG. 1, image processing module 116 resides on computer-readable storage media 118 of server 104. Server 104 also includes one or more processors 120 that can execute the modules residing on computer-readable storage media 118. In some embodiments, the image processing module and the image reside on the same computer-readable storage media, or on the same device. For example, a user can upload an image to an image storage application that includes the image processing module or a user device can include the image processing module, as shown in FIG. 1.

In still other embodiments, image processing module 116 can reside on multiple devices, such as server 104 and user device 102 or multiple servers. In such embodiments, image processing can be conducted across various devices. For example, one server can conduct one portion of the process, and another server can conduct another portion of the process.

Image processing module 116 can include various modules representing functionality useful for image editing and other processing. For example, image processing module can include tools for cropping, adjusting the brightness or color of an image, adding frames or other graphics, and the like. Image processing module 116 can also include image sharpening module 122. Image sharpening module 122 is representative of functionality to estimate a sharpening amount and apply an unsharp mask to an image, as described in more detail below.

Image sharpening module 122 can be used to reduce the blurriness of an image according to various values. For example, a value associated with an image sharpening amount represents how aggressively the image is to be sharpened. A value associated with a sharpening radius represents the size of a neighborhood used to define a local contrast between a central pixel and its neighborhood. In various embodiments, the sharpening radius can be the value of the standard deviation of a Gaussian low-pass filter used in the unsharp mask filter. A threshold value represents a difference that exists between the central pixel and the local neighborhood average before a change is made. For example, the threshold value represents a difference between the central pixel and the local neighborhood average before the pixel will be sharpened. In various embodiments, image sharpening module 122 can use these values to automatically estimate a sharpening amount for improved image sharpening. The automatic estimation of a sharpening amount can result in image sharpening independent of subjective user determination.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an example environment in accordance with one or more embodiments, consider now a discussion describing how image sharpening can take place in accordance with one or more embodiments.

Image Sharpening

Figure 2:
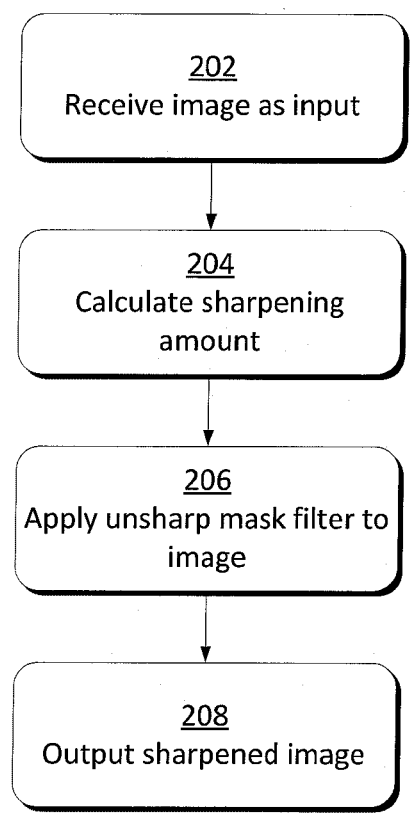
FIG. 2 illustrates an example method in accordance with one or more embodiments.

FIG. 2 illustrates an example process 200 for sharpening an image in accordance with one or more embodiments. The process can be implemented in connection with any suitable hardware, software, firmware, or combination thereof. In at least some embodiments, the process can be performed by any suitable computing device, such as user device 102 or server 104 in FIG. 1, or more specifically, by image sharpening module 122 which can be embodied on any suitable type of computing device.

Block 202 receives an image as input. This can be performed in any suitable way. For example, a user can upload image 114 to server 104 through network 106 for processing by image processing module 116. Alternatively or additionally, a user can retrieve an image from local storage or from the Internet using a user device including image processing module 116.

Block 204 calculates a sharpening amount. This can be performed in any suitable way, examples of which are provided below.

Block 206 applies, using the calculated sharpening amount as a value, an unsharp mask filter to the image. This can be done in any suitable way. For example, the value of each pixel in the image can be adjusted according to the unsharpening equation $$X'=(A+1)(X-G(X))+G(X)=(1+A)X-AG(X)$$

where X' is the adjusted value of the pixel, X is the value of the pixel before sharpening, A is the sharpening amount calculated at block 204, and G(X) is the result of the convolution of X with a Gaussian kernel G. In other words, G(X) is the result of X filtered by the Gaussian low-pass filter G:

$$G(X)=G \otimes X$$

The standard deviation utilized in G(X) can vary depending on the particular embodiment. For example, in some embodiments, the standard deviation is set to about one pixel. Additionally, other unsharpening equations can be used, some of which are more elaborate, such as $$X'=AF(X-G(X))+X$$

where F(.) is a regular functional that could be, for example:

$$F(x) = x \text{ if } |x| \geq \tau \text{ and } F(x) = 0 \text{ otherwise}$$

or $$F(x) = x \text{ if } |x| \geq \tau \text{ and } F(x) = \frac{x^2}{\tau} \text{ otherwise}$$

where $\tau$ is a positive threshold. The threshold $\tau$ can be set to an appropriate value such that a signal smaller than $\tau$ is likely due to noise and should not be amplified or should be amplified according to an adjusted value.

In various embodiments, blocks 204 and 206 are conducted for individual channels, e.g., each channel of the image. For example, for an image represented by R, G and B components, blocks 204 and 206 would be performed for individual or each of the R, G, and B color channels independently.

Next, block 208 outputs a sharpened image. This can be performed in any suitable way. For example, the system can save the sharpened image as a new file, overwrite the file that was input, or cause the sharpened image to be displayed to a user.

Figure 3:
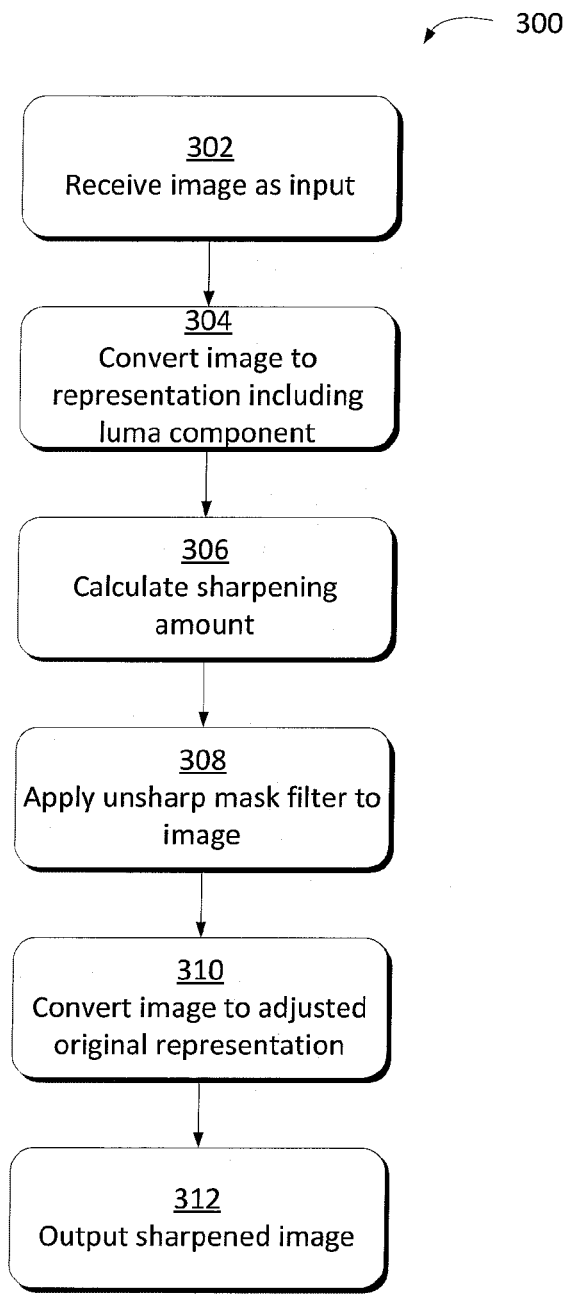
FIG. 3 illustrates an example method in accordance with one or more embodiments.

In various embodiments, for example when an image is a color image, e.g., an RGB image, the process can further include converting the image to an alternate representation and sharpening based on luminosity data. FIG. 3 shows an example process 300 describing such a conversion in accordance with one or more embodiments.

Block 302 receives an image as input. This can be performed in any suitable way. For example, a user can upload image 114 to server 104 through network 106 for processing by image processing module 116. Alternatively or additionally, a user can retrieve an image from local storage or from the Internet using a user device including image processing module 116.

Next, block 304 converts the image to a representation including a luma component. This can be done in any suitable way. For example, an image can be converted from RGB color to a luma-chroma1-chroma2 representation such as YIQ or YUV. This can be done in any suitable way.

Block 306 calculates a sharpening amount based on the luma component. This can be done in any suitable way, examples of which are provided above and below. Block 308 applies, using the calculated sharpening amount, an unsharp mask filter to the image, and particularly to the luma component of the image, to generate an adjusted representation of the image. This can be done in any suitable way, examples of which are provided above and below. In some embodiments, the unsharp mask is applied to the luma or lightness channel instead of each channel in the image representation.

Block 310 converts the image back to an adjusted original representation. This can be done in any suitable way. For example, the adjusted values for each pixel in the luma-chroma1-chroma2 representation can be converted into adjusted RGB color values, or an adjusted RGB representation of the image.

Block 312 outputs a sharpened image relative to the image received. The sharpened RGB image is based on the adjusted RGB representation. This can be performed in any suitable way. For example, the system can save the sharpened image as a new file, overwrite the file that was input, or cause the sharpened image to be displayed to a user.

Having described processes for sharpening an image in accordance with one or more embodiments, consider now a discussion describing how a sharpening amount for an unsharp mask filter can be automatically estimated in accordance with one or more embodiments.

Automatic Estimation of Sharpening Amount Value

Figure 4:
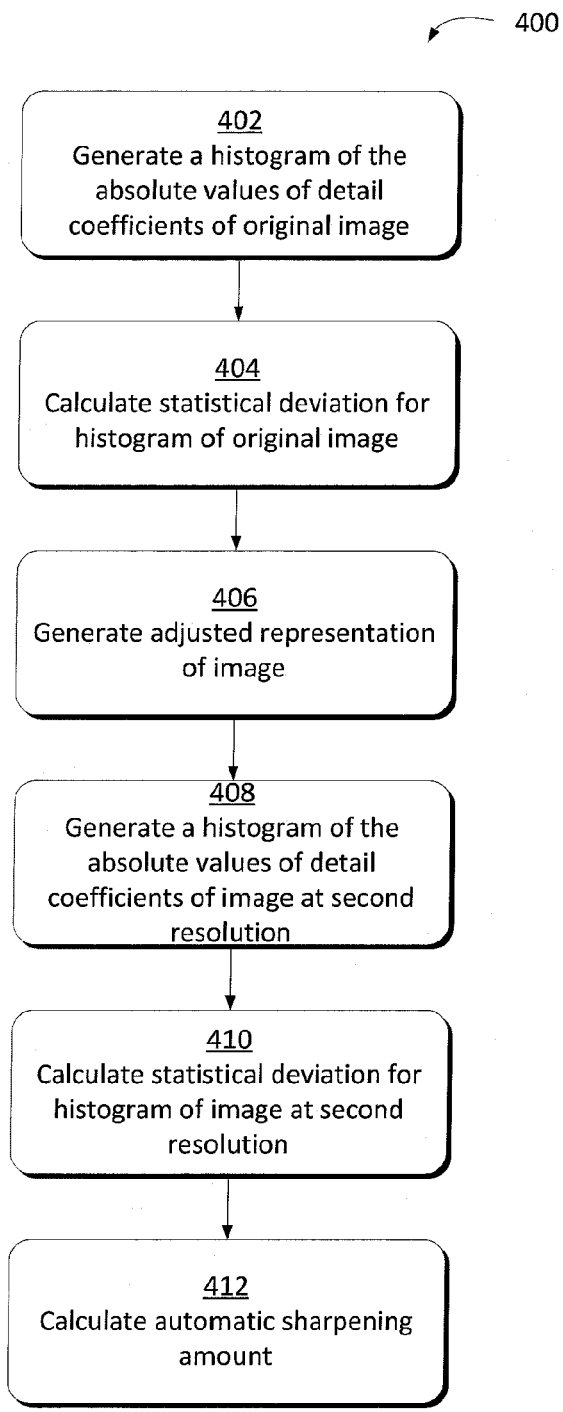
FIG. 4 illustrates an example method in accordance with one or more embodiments.

Turning now to FIG. 4, an example process 400 for automatically estimating a sharpening amount is illustrated, in accordance with one or more embodiments.

Block 402 generates a histogram of the absolute values of detail coefficients for the original image. Detail coefficients can be represented according to an expression $$X - G(X)$$

where X is the value of the pixel and G(X) is the result of X filtered by the Gaussian low-pass filter G. The standard deviation utilized in G(X) can vary depending on the particular embodiment. For example, in some embodiments, the standard deviation for the Gaussian low-pass filter is set to about one pixel.

Block 404 calculates one or more statistical deviations for the histogram of the original image, e.g., the image at a first resolution. Statistical deviations can include, for example, a standard deviation, an absolute deviation, a median absolute deviation, a third-quartile absolute deviation, a ninth-decile absolute deviation, and a ninety-ninth-centile absolute deviation. The particular statistical deviation calculated can vary depending on the embodiment. In some embodiments, various statistical deviations can be calculated and the deviation that leads to the most conservative sharpening amount value can be used.

Block 406 generates an adjusted representation of the image at a second resolution. This can be performed in any suitable way. For example, the system can generate a 2× downsampled image with a resolution that is one-half that of the original image. Other resolutions for the image can be selected depending on the particular embodiment.

Block 408 generates a histogram of the absolute values of detail coefficients for the image at the second resolution, and block 410 calculates one or more statistical deviations for the histogram of the image at the second resolution. This can be done in any suitable way, such as described in accordance with processing of the original image above.

Block 412 calculates an automatic sharpening amount using the statistical deviations calculated at block 410. The automatic sharpening amount can be calculated according to an expression $$A = \text{clamp}\left(0, A_{max}, \frac{\min(\mu D_1, D_{max})}{D_0} - 1\right)$$

where $$\text{clamp}(v_{min}, v_{max}, \text{value}) = \max(v_{min}, \min(v_{max}, \text{value}))$$

and where A is the automatic sharpening amount, $D_1$ is the statistical deviation of the histogram of the image at the second resolution (the downsampled image), $D_0$ is the statistical deviation of the histogram of the image at its initial resolution (the original image), $D_{max}$ is a predetermined maximum value for the statistical deviation at the initial resolution, $\mu$ is a ratio of the expected statistical deviation of the image at its initial resolution and the expected statistical deviation of the image at the second resolution, and $A_{max}$ is a maximum sharpening amount. In various embodiments, $\mu$ is equal to 0.94. $A_{max}$ can vary depending on the particular embodiment and can be adjusted to ensure the system does not generate unreasonably large values for A and, therefore, maintain natural-looking results, although in various embodiments, $A_{max}=2.0$.

In various embodiments, $D_1$, $D_0$, and $D_{max}$ can be replaced with the corresponding statistical deviation value, such as the value of the standard deviation, absolute deviation, median absolute deviation, third-quartile absolute deviation, ninth-decile absolute deviation, or ninety-ninth-centile absolute deviation or the conservative value resulting from a comparison of more than one statistical deviations.

In some embodiments, the values of both $\mu$ and $D_{max}$ can be determined according to data collected from linear regression analyses performed on images that have been sharpened by an operator. Such analyses can be conducted at various time periods for calibration purposes, or can be conducted prior to implementation or first use. In various embodiments, a sample set of images sharpened by an operator is selected. Two histograms of the detail coefficients in the image are generated for each image in the set: one histogram of the detail coefficients in the image at its initial resolution and one histogram of the detail coefficients in the image at its second resolution (e.g., half resolution). For each histogram, one or more statistical deviations are calculated.

Figure 5:
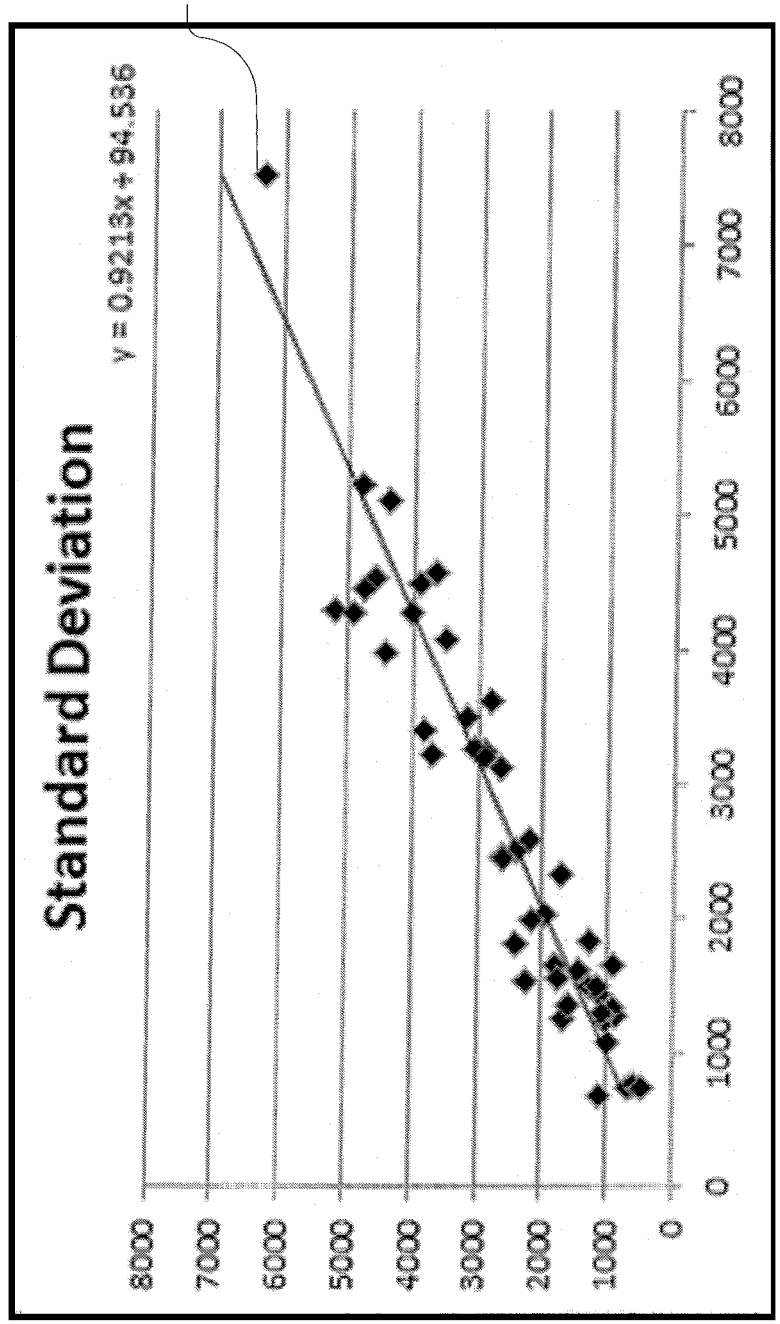
FIG. 5 illustrates an example scatter plot in accordance with one or more embodiments.

Next, a scatter plot is generated for the respective statistical deviations with the x-axis representing the value of the statistical deviation of the values for each image in the sample set at its initial resolution, and the y-axis representing the value of the statistical deviation of the values for each image at its second, or downsampled resolution. FIG. 5 shows an example scatter plot 500. On scatter plot 500, the x-axis represents the standard deviation for histograms of the detail coefficients of each image in the sample set at its initial resolution, and the y-axis represents the standard deviation for histograms of the detail coefficients of each image in the sample set at its second resolution.

A linear regression is performed on the scatter plot. For example, in FIG. 5, the linear regression yields a line according to the equation $$y = 0.9213x + 94.536$$

From the result of the linear regression, the slope of the line (e.g., 0.9213) can be used as the value of $\mu$ for calculations of an automatic sharpening amount. In various embodiments, other regressions can be used. The use of different regressions can yield various values for the slope of the line for use as the value of $\mu$ for calculations of an automatic sharpening amount. For example, fitting a regression represented by $$y=ax$$

to the scatter plot shown in FIG. 0.5 can yield a slope of 0.94 for use as the value of $\mu$. Other regressions can be used, depending on the particular embodiment. Additionally, the value of $D_{max}$ can be selected by identifying the maximum value of the respective statistical deviation in the sample set of images. For example, in FIG. 5, the value of $D_{max}$ can be identified using point 502.

Once the automatic sharpening amount has been calculated, it can be used in an unsharpening equation, examples of which are provided above, and applied to the image to produce a sharpened image. In some embodiments, the automatic sharpening amount can be further adjusted, such as through conducting multiple iterations of one or more processes described above, each utilizing the sharpened image from the previous iteration as the input, until the automatic sharpening amount is approximately zero, or by allowing a user to adjust the automatic sharpening amount after it is provided.

Having described various embodiments of automatically estimating a sharpening amount to be utilized in an unsharp mask, consider now a discussion describing a system that can be used to implement one or more embodiments.

Example System

Figure 6:
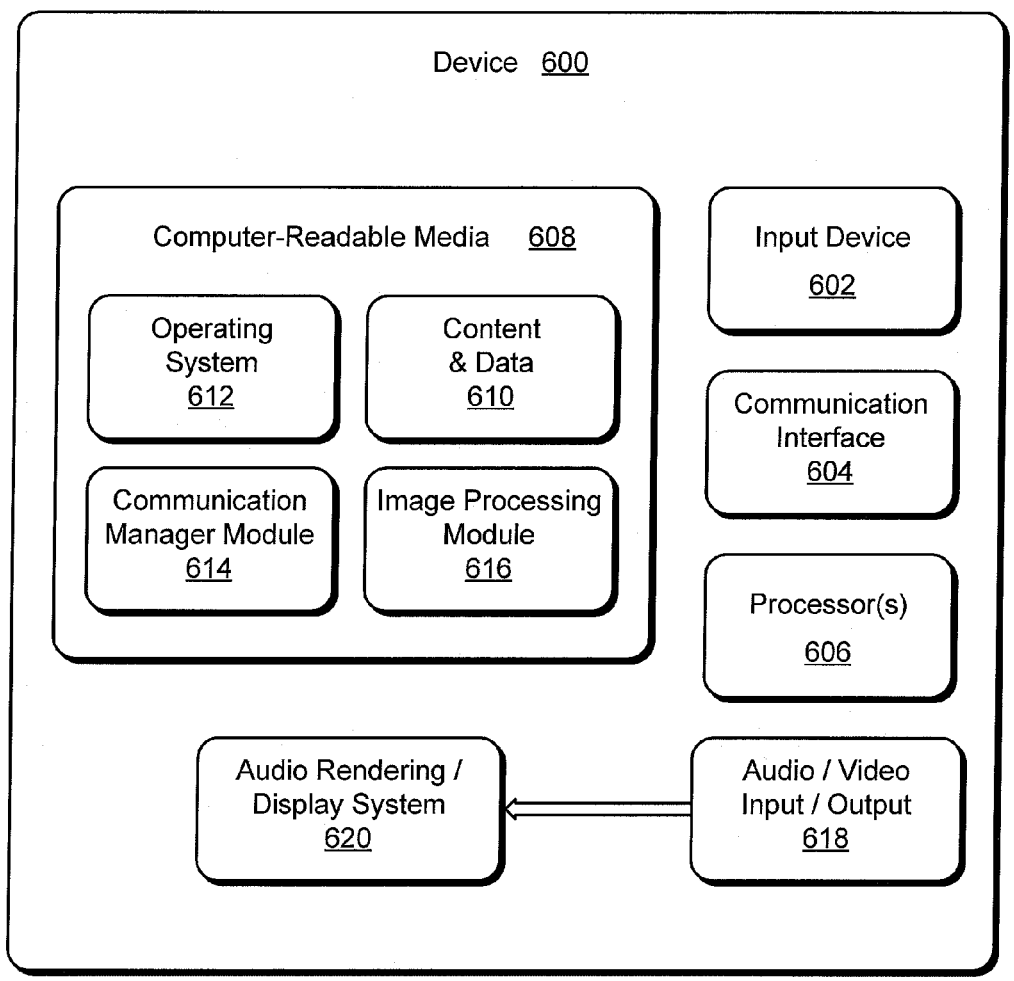
FIG. 6 depicts an example system that can be used to implement one or more embodiments.

FIG. 6 illustrates various components of an example device 600 that can practice the embodiments described above. In one or more embodiments, device 600 can be implemented as a client device, such as client or user device 102 in FIG. 1. Device 600 can also be implemented as a server, such as server 104 in FIG. 1.

Device 600 includes input device 602 that may include Internet Protocol (IP) input devices as well as other input devices, such as a keyboard. Device 600 further includes communication interface 604 that can be implemented as any one or more of a wireless interface, any type of network interface, and as any other type of communication interface. A network interface provides a connection between device 600 and a communication network by which other electronic and computing devices can communicate data with device 600. A wireless interface can enable device 600 to operate as a mobile device for wireless communications.

Device 600 also includes one or more processors 606 (e.g., any of microprocessors, controllers, and the like) which process various computer-executable instructions to control the operation of device 600 and to communicate with other electronic devices. Device 600 can be implemented with computer-readable media 608, such as one or more memory components, examples of which include random access memory (RAM) and non-volatile memory (e.g., any one or more of a read-only memory (ROM), flash memory, EPROM, EEPROM, etc.). A disk storage device may be implemented as any type of magnetic or optical storage device, such as a hard disk drive, a recordable and/or rewriteable compact disc (CD), any type of a digital versatile disc (DVD), and the like.

Computer-readable media 608 provides data storage to store content and data 610, such as an image 114, as well as device executable modules and any other types of information and/or data related to operational aspects of device 600. One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium and thus is not a signal bearing medium. Examples of a computer-readable storage medium include a random access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 612 can be maintained as a computer executable module with the computer-readable media 608 and executed on processor 606. Device executable modules can also include a communication manager module 614 and an image processing module 616 that operate as described above and below. Image processing module 616 can be, for example, image processing module 116 which includes image sharpening module 122 as described above and below.

Device 600 also includes an audio and/or video input/output 618 that provides audio and/or video data to an audio rendering and/or display system 620. The audio rendering and/of display system 620 can be implemented as integrated component(s) of the example device 600, and can include any components that process, display, and/of otherwise render audio, video, and image data.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable storage devices. The features of the techniques described above are platform-independent, meaning that the techniques may be implemented on a variety of commercial computing platforms having a variety of processors.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A computer-implemented method comprising:
receiving an image having an initial resolution;
automatically calculating a sharpening amount based on the image by utilizing at least one calculated statistical deviation of a histogram of the image at the initial resolution and at least one calculated statistical deviation of a histogram of the image at a second resolution;
applying an unsharp mask filter to the image, the unsharp mask filter employing the sharpening amount and being represented by an expression $$X'=AF(X-G(X))+X$$

where X' is an adjusted value of a pixel in the image, X is a value of the pixel in the image before sharpening, A is the sharpening amount, and G(X) is a result of a convolution of X with a Gaussian kernel G with a standard deviation of one pixel, and where $$F(x) = x \text{ if } |x| \geq \tau \text{ and } F(x) = \frac{x^2}{\tau} \text{ otherwise}$$

where $\tau$ is a positive threshold; and
outputting a sharpened image relative to the image received.

2. The computer-implemented method of claim 1, the second resolution of the image being one-half of the initial resolution of the image.

3. The computer-implemented method of claim 1, wherein the at least one calculated statistical deviation calculated comprises one or more of a standard deviation, an absolute deviation, a median absolute deviation, a third-quartile absolute deviation, a ninth-decile absolute deviation, or a ninety-ninth-centile absolute deviation.

4. The computer-implemented method of claim 1, automatically calculating a sharpening amount based on the image by utilizing at least one calculated statistical deviation of a histogram of the image at the initial resolution and at least one calculated statistical deviation of a histogram of the image at a second resolution comprising:
generating a histogram of absolute values of detail coefficients of the image at the initial resolution;
calculating at least one statistical deviation of the histogram of the image at the initial resolution;
generating a histogram of absolute values of detail coefficients of the image at the second resolution;
calculating at least one statistical deviation ~f the histogram of the image at the second resolution; and
calculating the sharpening amount according to an expression $$A = \text{clamp}\left(0, A_{max}, \frac{\min(\mu D_1, D_{max})}{D_0} - 1\right)$$

where $$\text{clamp}(v_{min}, v_{max}, \text{value}) = \max(v_{min}, \min(v_{max}, \text{value}))$$

and where A is the sharpening amount, $D_1$ is the statistical deviation of the histogram of the image at the second resolution, $D_0$ is the statistical deviation for histogram of the image at the initial resolution, $D_{max}$ is a predetermined maximum value for the statistical deviation, $\mu$ is equal to 0.94, and $A_{max}$ is equal to 2.0.

5. The computer-implemented method of claim 4, wherein the at least one statistical deviation comprises one or more of a standard deviation, an absolute deviation, a median absolute deviation, a third-quartile absolute deviation, a ninth-decile absolute deviation, or a ninety-ninth centile absolute deviation.

6. One or more computer-readable storage media comprising instructions that are executable to cause a device to perform a process comprising:
automatically calculating a sharpening amount based on an image by utilizing at least one statistical deviation of a histogram of the image at a first resolution and at least one statistical deviation of a histogram of the image at a second resolution by
calculating two or more of a standard deviation, an absolute deviation, a median absolute deviation, a third-quartile absolute deviation, a ninth-decile absolute deviation, or a ninety-ninth-centile absolute deviation of the histogram of the image at the initial resolution;
comparing the two or more calculations to determine a conservative statistical deviation of the histogram of the image at the initial resolution;
calculating a conservative statistical deviation of the histogram of the image at the second resolution, the conservative statistical deviation of the histogram of the image at the second resolution corresponding to the conservative statistical deviation of the histogram of the image at the initial resolution; and
calculating the sharpening amount according to an expression $$A = \text{clamp}\left(0, A_{max}, \frac{\min(\mu D_1, D_{max})}{D_0} - 1\right)$$

where $$\text{clamp}(v_{min}, v_{max}, \text{value}) = \max(v_{min}, \min(v_{max}, \text{value}))$$

and where A is the sharpening amount, $D_1$ is the conservative statistical deviation of the histogram of the image at the second resolution, $D_0$ is the conservative statistical deviation for histogram of the image at the initial resolution, $D_{max}$ is a predetermined maximum value for the statistical deviation, $\mu$ is equal to 0.94, and $A_{max}$ is equal to 2.0;
applying an unsharp mask filter to the image, the unsharp mask filter employing the sharpening amount; and
outputting a sharpened image relative to the image.

7. A device comprising:
one or more processors;
one or more computer-readable storage media; and
one or more modules embodied on the one or more computer-readable storage media and executable under the influence of the one or more processors, the one or more modules comprising an image sharpening module configured to perform operations comprising:
receiving an image having an initial resolution;
automatically calculating a sharpening amount based on the image by utilizing at least one calculated statistical deviation of a histogram of the image at the initial resolution and at least one calculated statistical deviation of a histogram of the image at a second resolution;
applying an unsharp mask filter to the image, the unsharp mask filter employing the sharpening amount, wherein the unsharp mask filter is represented by an expression $$X' = AF(X - G(X)) + X$$

where X' is an adjusted value of a pixel in the image, X is a value of the pixel in the image before sharpening, A is the sharpening amount calculated, and G(X) is a result of a convolution of X with a Gaussian kernel G with a standard deviation of one pixel, and where $$F(x) = x \text{ if } |x| \geq \tau \text{ and } F(x) = \frac{x^2}{\tau} \text{ otherwise}$$

where $\rho$ is a positive threshold; and
outputting a sharpened image relative to the image received.

8. The device of claim 7, wherein the second resolution of the image is one half of the initial resolution of the image.

9. The device of claim 7, wherein the at least one calculated statistical deviation calculated comprises one or more of a standard deviation, and absolute deviation, a median absolute deviation, a third-quartile absolute deviation, a ninth-decile absolute deviation, or a ninety-ninth-centile absolute deviation.

10. The device of claim 7, wherein said automatically calculating comprises:
generating a histogram of absolute values of detail coefficients of the image at the initial resolution;
calculating at least one statistical deviation of the histogram of the image at the initial resolution;
generating a histogram of absolute values of detail coefficients of the image at the second resolution;
calculating at least one statistical deviation of the histogram of the image at the second resolution; and
calculating the sharpening amount according to an expression $$A = \text{clamp}\left(0, A_{max}, \frac{\min(\mu D_1, D_{max})}{D_0} - 1\right)$$

where $\text{clamp}(v_{min}, v_{max}, \text{value}) = \max(v_{min}, \min(v_{max}, \text{value}))$ and where A is the sharpening amount, $D_1$ is the statistical deviation of the histogram of the image at the second resolution, $D_0$ is the statistical deviation for histogram of the image at the initial resolution, $D_{max}$ is a predetermined maximum value for the statistical deviation, $\mu$ is equal to 0.94, and $A_{max}$ is equal to 2.0.

11. The device of claim 10, wherein the at least one statistical deviation calculated comprises one or more of a standard deviation, an absolute deviation, a median absolute deviation, a third-quartile absolute deviation, a ninth-decile absolute deviation, or a ninety-ninth-centile absolute deviation.

12. A computer-implemented method comprising:
receiving an image having an initial resolution;
automatically calculating a sharpening amount based on the image by utilizing at least one calculated statistical deviation of a histogram of the image at the initial resolution and at least one calculated statistical deviation of a histogram of the image at a second resolution by:
generating a histogram of absolute values of detail coefficients of the image at the initial resolution;
calculating at least one statistical deviation of the histogram of the image at the initial resolution;
generating a histogram of absolute values of detail coefficients of the image at the second resolution;
calculating at least one statistical deviation ~f the histogram of the image at the second resolution; and
calculating the sharpening amount according to an expression $$A = \text{clamp}\left(0, A_{max}, \frac{\min(\mu D_1, D_{max})}{D_0} - 1\right)$$

where $\text{clamp}(v_{min}, v_{max}, \text{value}) = \max(v_{min}, \min(v_{max}, \text{value}))$ and where A is the sharpening amount, $D_1$ is the statistical deviation of the histogram of the image at the second resolution, $D_0$ is the statistical deviation for histogram of the image at the initial resolution, $D_{max}$ is a predetermined maximum value for the statistical deviation, $\mu$ is equal to 0.94, and $A_{max}$ is equal to 2.0;
applying an unsharp mask filter to the image, the unsharp mask filter employing the sharpening amount; and
outputting a sharpened image relative to the image received.

13. The computer-implemented method of claim 12, wherein the at least one statistical deviation comprises one or more of a standard deviation, an absolute deviation, a median absolute deviation, a third-quartile absolute deviation, a ninth-decile absolute deviation, or a ninety-ninth centile absolute deviation.

14. The computer-implemented method of claim 12, the unsharp mask filter being represented by an expression $X'=AF(X-G(X))+X$ where X' is an adjusted value of a pixel in the image, X is a value of the pixel in the image before sharpening, A is the sharpening amount, and G(X) is a result of a convolution of X with a Gaussian kernel G with a standard deviation of one pixel, and where $$F(x) = x \text{ if } |x| \geq \tau \text{ and } F(x) = \frac{x^2}{\tau} \text{ otherwise}$$

where $\tau$ is a positive threshold.

15. The computer-implemented method of claim 12, the unsharp mask filter being represented by an expression $X'=AF(X-G(X))+X$ where X' is an adjusted value of a pixel in the image, X is a value of the pixel in the image before sharpening, A is the sharpening amount, and G(X) is a result of a convolution of X with a Gaussian kernel G with a standard deviation of one pixel, and where $F(x)=x$ if $|x|\geq\tau$ and $F(x)=0$ otherwise where $\tau$ is a positive threshold.

16. A device comprising:
one or more processors;
one or more computer-readable storage media; and
one or more modules embodied on the one or more computer-readable storage media and executable under the influence of the one or more processors, the one or more modules comprising an image sharpening module configured to perform operations comprising:
receiving an image having an initial resolution;
automatically calculating a sharpening amount based on the image by utilizing at least one calculated statistical deviation of a histogram of the image at the initial resolution and at least one calculated statistical deviation of a histogram of the image at a second resolution by:
generating a histogram of absolute values of detail coefficients of the image at the initial resolution;
calculating at least one statistical deviation of the histogram of the image at the initial resolution;
generating a histogram of absolute values of detail coefficients of the image at the second resolution;
calculating at least one statistical deviation of the histogram of the image at the second resolution; and calculating the sharpening amount according to an expression $$A = clamp\left(0, A_{max}, \frac{\min(\mu D_1, D_{max})}{D_0} - 1\right)$$

where $\text{clamp}(v_{min}, v_{max}, \text{value}) = \max(v_{min}, \min(v_{max}, \text{value}))$ and where A is the sharpening amount, $D_1$ is the statistical deviation of the histogram of the image at the second resolution, $D_0$ is the statistical deviation for histogram of the image at the initial resolution, $D_{max}$ is a predetermined maximum value for the statistical deviation, $\mu$ is equal to 0.94, and $A_{max}$ is equal to 2.0;

applying an unsharp mask filter to the image, the unsharp mask filter employing the sharpening amount; and outputting a sharpened image relative to the image received.

17. The device of claim 16, wherein the at least one statistical deviation calculated comprises one or more of a standard deviation, an absolute deviation, a median absolute deviation, a third-quartile absolute deviation, a ninth-decile absolute deviation, or a ninety-ninth-centile absolute deviation.

18. The device of claim 16, wherein the unsharp mask filter is represented by an expression $$X'=AF(X-G(X))+X$$

where X' is an adjusted value of a pixel in the image, X is a value of the pixel in the image before sharpening, A is the sharpening amount calculated, and G(X) is a result of a convolution of X with a Gaussian kernel G with a standard deviation of one pixel, and where $$F(x) = x \text{ if } |x| \geq \tau \text{ and } F(x) = \frac{x^2}{\tau} \text{ otherwise}$$

where $\tau$ is a positive threshold.

* * * * *